United States Patent
Ambler

(10) Patent No.: US 8,911,082 B2
(45) Date of Patent: Dec. 16, 2014

(54) EYEWEAR LENSES WITH CONTROLLED FILTERS FOR NIGHT DRIVING

(71) Applicant: Younger Mfg. Co., Torrance, CA (US)

(72) Inventor: David Mark Ambler, Rancho Palos Verdes, CA (US)

(73) Assignee: Indizen Optical Technologies, SLL., Madrid (ES)

( * ) Notice: Subject to any disclaimer, the term of this patent is extended or adjusted under 35 U.S.C. 154(b) by 29 days.

(21) Appl. No.: 13/829,680

(22) Filed: Mar. 14, 2013

(65) Prior Publication Data

US 2014/0268031 A1 Sep. 18, 2014

(51) Int. Cl.
*G02C 7/10* (2006.01)

(52) U.S. Cl.
CPC ........................................ *G02C 7/104* (2013.01)
USPC ................................ 351/159.65; 351/159.62

(58) Field of Classification Search
CPC ........... G02C 7/10; G02C 7/104; G02C 7/108
USPC .......................................... 351/159.6–159.65
See application file for complete search history.

(56) References Cited

U.S. PATENT DOCUMENTS

| | | | |
|---|---|---|---|
| 2,358,602 A | 9/1944 | Snyder | |
| 3,111,675 A | 11/1963 | Mora | |
| 4,826,286 A | 5/1989 | Thornton, Jr. | |
| 5,218,386 A * | 6/1993 | Levien | 351/159.6 |
| 5,235,358 A | 8/1993 | Mutzhas et al. | |
| 5,428,409 A | 6/1995 | Silverstein | |
| 5,922,246 A | 7/1999 | Matsushita et al. | |
| 5,975,695 A | 11/1999 | Baiocchi et al. | |
| 6,027,816 A * | 2/2000 | Ono et al. | 428/447 |
| 6,615,409 B2 | 9/2003 | Youmans et al. | |
| 6,811,258 B1 | 11/2004 | Grant | |
| 6,979,083 B2 | 12/2005 | Kerns et al. | |

(Continued)

FOREIGN PATENT DOCUMENTS

FR 2301835 A1 9/1976
WO WO 9735215 9/1997

(Continued)

OTHER PUBLICATIONS

M.A. Mainster and G. T. Timberlake, "Why HID headlamps bother older drivers", British Journal of Ophthalmology, 2003, pp. 113-117, vol. 83, UK.

(Continued)

*Primary Examiner* — Darryl J Collins
(74) *Attorney, Agent, or Firm* — Sheppard, Mullin, Richter & Hampton LLP

(57) ABSTRACT

The present invention is embodied in an eyewear lens with at least two controlled, limited visible light blocking filters that attenuate its transmittance spectrum. More specifically, in the present invention, the eyewear lens attenuates limited amounts of light in at least two visible wavelength regions via controlled, limited blocking filters, wherein the overall luminous transmittance is at least 75%. The at least two controlled, limited blocking filters have their peak blocking wavelengths in the region of 410-500 nm and 530-620 nm, respectively. In a preferred embodiment, the minimum transmittance that occurs within the 410-500 nm region is ≥55% and the minimum transmittance that occurs within the 530-620 nm region is ≥65%. In another preferred embodiment, the eyewear lens comprises an anti-reflective coating on its inner surface (the eye-side of the lens).

18 Claims, 8 Drawing Sheets

(56) References Cited

U.S. PATENT DOCUMENTS

| | | |
|---|---|---|
| 7,106,509 B2 | 9/2006 | Sharp |
| 7,278,737 B2 | 10/2007 | Mainster et al. |
| 7,976,157 B2 | 7/2011 | Croft et al. |
| 8,043,371 B2 | 10/2011 | Paul et al. |
| 8,192,021 B2 | 6/2012 | Giraudet |
| 2011/0255051 A1 | 10/2011 | McCabe et al. |
| 2012/0008217 A1 | 1/2012 | Ishak et al. |

FOREIGN PATENT DOCUMENTS

| | | |
|---|---|---|
| WO | 2010068541 A1 | 6/2010 |
| WO | 2011130138 A1 | 10/2011 |
| WO | 2013188825 A1 | 12/2013 |

OTHER PUBLICATIONS

Advertisement for Nikon SeeCoat Blue anti-reflective coatings on ophthalmic lenses, 20/20 Magazine: 2012 Special Annual Seller's Guide, Aug. 15, 2012, pp. 76-77, USA.

"The Eye and Night Vision", American Optometric Association website, accessed Oct. 11, 2012. Article based on: Robert E. Miller and Thomas J. Tredici, "Night Vision Manual for the Flight Surgeon," USAF Special Report A1-SR-1992-0002, USA.

Advertisement for Total Night(TM) lens tint, Surfacing and Finishing Product Guide, vol. XXXIX, No. 24, 2011-2012, p. 87, USA.

* cited by examiner

EYEWEAR LENSES WITH CONTROLLED FILTERS FOR NIGHT DRIVING

CROSS-REFERENCE TO RELATED APPLICATIONS

None.

FEDERALLY SPONSORED RESEARCH OR DEVELOPMENT

Not applicable.

JOINT RESEARCH AGREEMENT

Not applicable.

SEQUENCE LISTING

Not applicable.

BACKGROUND OF THE INVENTION

1. Field of the Invention

The field of the invention relates generally to eyewear and more specifically to eyewear lenses, such lenses having optical properties enhanced for night driving.

2. Description of Related Art

Eyewear is commonly used to correct vision errors, aberrations and focusing deficiencies caused by age, disease or other factors. In addition to correcting physiological vision problems, eyewear may also be used to ameliorate physical or environmental conditions (such as glare, variable lighting, high intensity light, dust, condensation, etc.) that can affect sight.

One challenging condition for human vision is night driving. Several common occurrences in night driving are known to interfere with good vision, including momentary blindness from oncoming headlamps, glare and discomfort from following drivers' headlamps and reflections in rearview mirrors, tail lamps, and weather effects causing light scatter and decreased visibility. In addition, age-related changes in the eye can reduce visual ability while driving at night, as discussed, for example, in the article "Why HID headlamps bother older drivers," M. A. Mainster and G. T. Timberlake, British J. Ophthalmology, 87: 113-117 (2003).

The eye has a light sensitivity range of over twelve orders of magnitude. Typical bright daylight luminance (in cd/m2) ranges from over 1,000,000 to about 1000 cd/m2, dusk is approximately 30-0.1 cd/m2, bright moonlight is approximately 0.01 cd/m2, and an overcast night with no moon is about 0.0001 cd/m2. Different structures within the eye, the rods and cones, allow extended response and accommodation over such a wide range of conditions. However, under lower ambient light conditions, the eye's recovery time is much slower after sudden exposure to a bright light source; the eye's receptors are saturated, and commonly need ~10-60 minutes to re-adapt. Thus, exposure to bright headlamp light (which can easily range from 30-5000 lumens) when the eye has accommodated to lower light levels will saturate the eye's response, and compromise vision. Attenuation of light is a good method to reduce glare and momentary blinding effects from sudden exposure to bright lights. However, the low level of ambient light in night driving conditions means that any reduction in illumination is potentially deleterious to the safety and ability of the driver. Thus, it is not obvious that attenuation or filtering of light can be a successful approach to improve night driving vision.

Lens filters have been employed or proposed in the prior art for enhancement of vision in bright daylight conditions, but in these instances excess light is being removed to allow the eye to more efficiently respond to the high ambient illumination levels. For example, U.S. Pat. Nos. 5,235,358, 5,975,695, 7,106,509 B2, 7,278,737 B2, and U.S. patent application Ser. No. 13/029,997 (published as 2011/025505) all describe filters that substantially or completely block transmittance of light in one or more visible wavelength regions. In addition, light that is potentially damaging to the eye, such as ultraviolet or high-energy blue light, may be preferentially blocked. Given the very limited light available for night driving conditions, however, blocking substantial amounts of such nighttime illumination would not seem advisable.

There have been previous methods to modify lenses for eyewear (such as spectacles or goggles) to aid with the visual problems of night driving. Some of these have employed lenses wherein one portion of the lens is clear, and another portion is tinted, translucent, polarized, reflective or otherwise changes the light exposure to the eye. Various shapes, distributions and locations of the clear and light-attenuating regions on the lenses have been presented. U.S. Pat. No. 8,192,021 B2 describes another arrangement, in which the central portion of the lens is yellow-tinted to absorb blue light, while the periphery is red or orange to absorb light below 600 nm. Given the wide variety of techniques and products described, it is clear that a universal answer to concerns with night driving has not been achieved.

The present invention offers a new approach to address the concerns with exposure to bright light when night driving.

BRIEF SUMMARY OF THE INVENTION

The inventor found that by using only moderate attenuation in specific visible wavelength regions, the overall luminous transmittance of the lens could be maintained at an acceptably high level while ameliorating some of the damaging effects of automotive headlamps and sudden bright light exposure during night driving.

More specifically, in the present invention, the eyewear lens attenuates limited amounts of light in at least two visible wavelength regions via controlled, limited blocking filters, such that the overall luminous transmittance is at least 75%, but specific, controlled and lower transmittance occurs within the region between 410 nm and 500 nm, and within the region between 530 nm and 620 nm. In a preferred embodiment, the minimum transmittance that occurs within the 410-500 nm region is >55% and the minimum transmittance that occurs within the 530-620 nm region is >65%. In another preferred embodiment, the eyewear lens comprises an anti-reflective coating on its inner surface (the eye-side of the lens).

In another preferred embodiment, the controlled, limited blocking filter within the 410-500 nm region has its minimum transmittance at a peak blocking wavelength between 430 nm and 480 nm. In a further preferred embodiment, the minimum transmittance at the filter's peak blocking wavelength between 430 nm and 480 nm has a value of 55-75%. In another preferred embodiment, the controlled, limited blocking filter in the 410-500 nm region has its minimum transmittance at a peak blocking wavelength between 430 nm and 460 nm. In another preferred embodiment, the filter with a peak blocking wavelength between 430 nm and 460 nm has a FWHM (full width at half maximum)>25 nm. In another preferred embodiment, the filter with a peak blocking wavelength between 430 nm and 460 nm has a FHWM greater than 25 nm but less than or equal to 45 nm.

In another preferred embodiment, the controlled, limited blocking filter in the 530-620 nm region has its minimum transmittance at a peak blocking wavelength between 550 nm and 600 nm. In another preferred embodiment, the controlled, limited blocking filter in the 530-620 nm region has its minimum transmittance at a peak blocking wavelength between 560 nm and 590 nm. In another preferred embodiment, the minimum transmittance at the filter's peak blocking wavelength between 560 nm and 590 nm is >70%. In another preferred embodiment, the filter with a peak blocking wavelength between 560 nm and 590 nm has a FHWM greater than about 30 nm but less than about 60 nm.

In preferred embodiments of the invention, the at least two controlled, limited blocking filters in the visible spectral region attenuate emission bands of automotive headlamps. In another preferred embodiment of the invention, the two controlled, limited blocking filters in the visible spectral region attenuate at least two emission bands of high intensity discharge lamps used for night-time roadway illumination. In another preferred embodiment, the two controlled, limited blocking filters in the visible spectral region attenuate at least two emission bands of light-emitting diodes used for night-time roadway illumination.

DETAILED DESCRIPTION OF THE INVENTION

Figure 1:
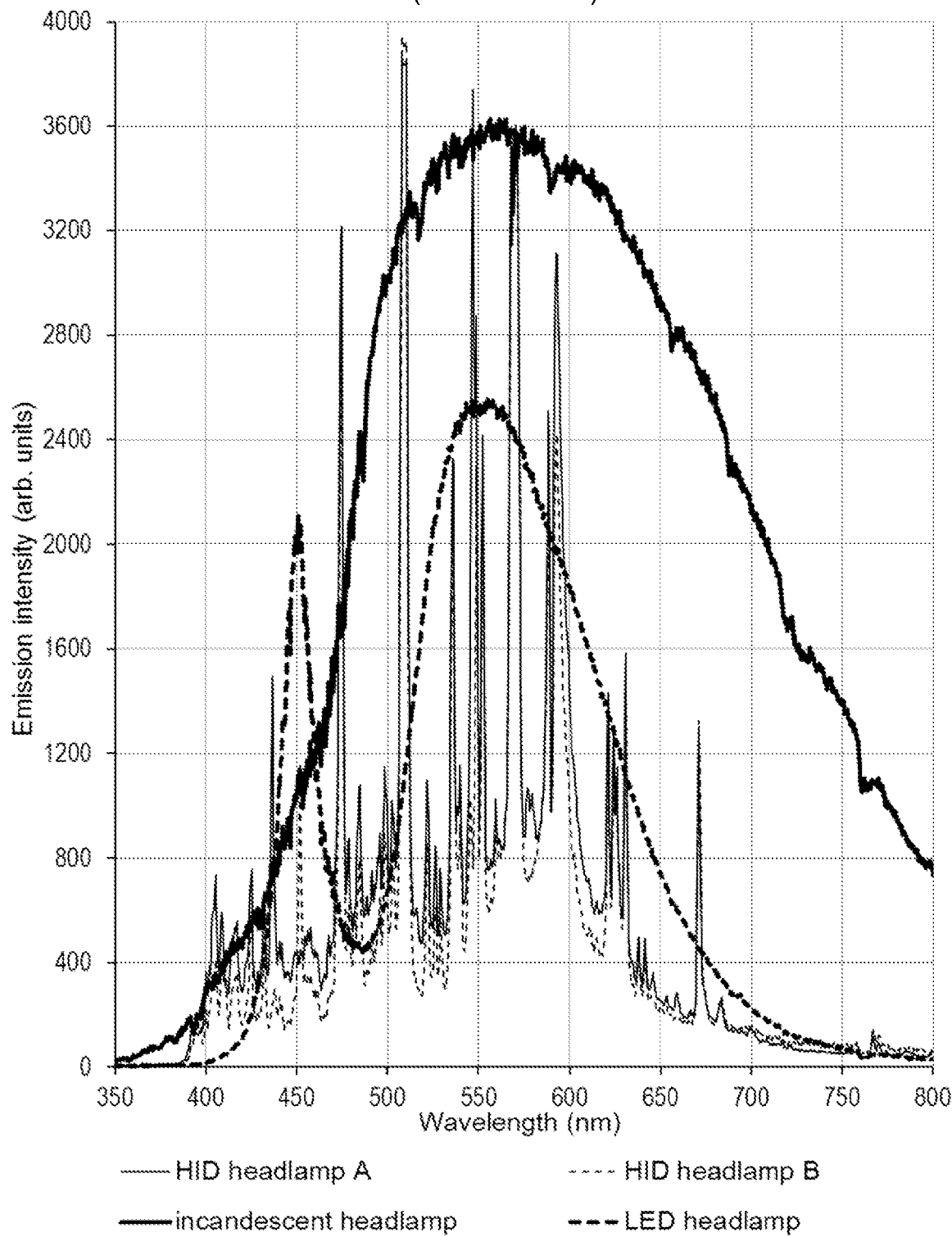
FIG. 1 (PRIOR ART) shows exemplary emission spectra for some automotive headlamps that might be encountered while driving.

The present invention is embodied in an eyewear lens with at least two controlled, limited visible light blocking filters that attenuate its transmittance spectrum. Eyewear lenses are optical lenses worn in front of the eyes. They may be plano, prescription or non-prescription lenses. Depending on the needs and desires of the individual, they may serve one or more purposes: correct vision, provide protection or improved comfort for the eyes, or be a fashionable accessory. Eyewear lenses are commonly mounted in eyeglass frames, carriers or goggles.

The present invention addresses controlled but limited filtering of visible light, with particular benefit for night driving. Ophthalmic-quality eyewear lenses often comprise absorbers or materials that attenuate ultraviolet light (light in the range of 280 nm to about 380 nm), and the lens materials or additives may also attenuate exposure to infrared light (above 800 nm). The visible light spectrum can be defined as light energy in the range of about 380 nm to about 780 nm, and is the range of highest sensitivity for response by the human eye.

Eyewear lenses may comprise various visible light filters to address some of the needs and desires mentioned previously. For example, they may be tinted to fashionable colors. For other applications, such as welding, they may comprise filters that strongly absorb or block visible light, to protect against the intense light generated by welder's flares.

Visible light filters can perform by reflecting or absorbing light, often created by carefully combining or layering materials that cause light interference effects. When such filters cause less light to be transmitted through them, they are called blocking filters. The wavelength region affected by the filter will have lower transmittance values than other portions of the light spectrum. The wavelength within this filtered region where the lowest transmittance is measured is called the peak blocking wavelength.

Night driving presents unique challenges to the human eye, and to eyewear. In common night driving, the eye will respond to light changes much less quickly than during bright daylight conditions. At night, mesopic response may be common during city driving, and scotopic response may contribute when driving in the country or during extended freeway driving. In both these situations the rods are more involved in the visual perception. Due to the rods' different response time and higher light sensitivity, the eye can easily become oversaturated by sudden exposures to bright light (like headlamps), and will take much longer to recover than under daylight conditions. For example, after exposure to a brighter light, it can take at least 10 minutes to recover under mesopic conditions, and 20-60 minutes to recover under scotopic conditions.

When eyewear is used during night driving, there is the additional concern of direct reflection from the lens surface into the eye. This is particular problematic when exposed to bright headlamps from a following vehicle. Automotive mirrors are adjustable to allow the driver to re-direct such lights and try to avoid their direct impingement on the eyes, but redirection cannot be done practically with eyewear. Lens surfaces typically reflect about 4-8% of the incident visible light, depending on the refractive index of the surface material. While that sounds like a small amount, it is much more affecting when the background light level is low and suddenly 4-8% of a bright light—that can be orders of magnitude brighter than the ambient light level—is reflected or directed into the eye. Anti-reflective coatings on the inner (eye-side) surface of the eyewear lens can lessen this exposure, but additional measures to aid the driver, such as the present invention, are desirable.

The inventor recognized the importance of maintaining a high overall visible luminous transmittance of the eyewear lens so that it would be practical for night driving. This is in contrast to daylight filtering (such as sunglasses) where a high background luminance means that one can remove a significant or even majority portion of the light without a deleterious effect on the sensitivity of the eye. Remember that it is common for sunglasses to have a value of only about 10-20% luminous transmittance. The inventor established a requirement that this invention for night driving must allow at least 75% luminous transmittance. In another preferred embodiment, the eyewear lens has at least 80% luminous transmittance.

The inventor investigated the spectral signatures of common light sources, and particularly actual or potential headlamp sources. These included incandescent, high intensity discharge (HID) and light emitting diode (LED) lamps. FIG. 1 provides exemplary visible emission spectra (arbitrary intensity units) for some manufacturer-installed automobile headlamps. The incandescent headlamps sampled had similar features to each other, with a broad emission band as shown in FIG. 1. The LED headlamps sampled showed similar features to each other, but a different emission spectrum than the incandescent headlamps. The LED headlamps sampled, as the example shows in FIG. 1, exhibited a narrower emission band near about 450 nm and a broader emission band in the longer wavelength region. Sampled HID headlamps showed more variation in their emission spectra, and two examples are shown in FIG. 1. Some of their differing features can be seen near 435, 450, and 535-545 nm.

This review of some existing lights provided the inventor with better information on the variety of headlamps on the market, and the multiple, different spectral emission features that might require filtering by this invention. The term headlamps is used here to encompass any illumination source mounted on vehicles and visible to another driver, including foglights, running lights and other added features.

The inventor found that, rather than a broad spectral filter, a more controlled and limited blocking filter, such as a narrow bandpass filter or multiple narrow bandpass filters, could be a successful approach to controlling the light transmittance. This was postulated due to the narrow, intense peaks of the HID and LED lamps. However, contrary to normal bandpass designs, the invention required only a limited reduction in transmittance, instead of high blocking values. Thus, instead of a filter at a controlled given wavelength having nearly 0% T, the inventor preferred a limited blocking filter that still allowed about 55% or even more light transmittance. The requirement for this invention was in essence a very leaky bandpass filter.

Spectral filters such as bandpass filters are typically described by the wavelength location at which they have maximum effect and by the width of their effecting change on the spectrum. In this invention, the filter is designed to decrease transmittance in a spectral region, and therefore, the wavelength region where minimum transmittance occurs will be cited and referred to as the peak blocking wavelength. Filter widths are often characterized by the spectral range (expressed in nm values) where the filter reaches half of its maximum change. This FWHM (full width at half maximum) will be designated either by the actual wavelength values higher and lower than the peak blocking wavelength where half of the total change in transmittance occurs, or by the wavelength range spanned between these values.

To further explain the FWHM concept, here is a purely illustrative example. A controlled, limited blocking filter has a peak blocking wavelength of 450 nm and a value of 60% T at that wavelength. The baseline transmittance at wavelengths higher and lower than the filtered region is 90%. Therefore, the FWHM % T value would be 75% [60+(½×(90−60))] and the "width" of the FWHM is then the range between the first wavelength below 450 nm and the first wavelength above 450 nm where this transmittance value occurs. Let us say 75% T is observed at 420 nm and 480 nm. Then the FWHM for this filter would be (480-420) nm, or 60 nm.

The controlled, limited blocking filters were designed by the inventor to exhibit an unusually limited reduction in transmittance. This was specifically designed for the beneficial operation of the invention during night driving. First, such designedly small reductions would allow the overall visible luminous transmittance to remain high, so that the overall visible light availability would not be unfavorably compromised while driving at night. Instead, only a portion of the potentially blinding light from the headlamp would be reduced. Second, a small reduction of these bright light sources could give a visually demonstrable effect, due to the relatively narrow emission lines and the high headlamp luminance versus the ambient night-time light level. This was particularly desirable and effective for the newer, non-incandescent light sources.

Two spectral regions were targeted by the inventor for these controlled, limited blocking filters. One is in the shorter wavelength, blue region of the visible spectrum, and one is nearer the peak of the photopic sensitivity of the eye. This approach will result in controlled (rather than total) reductions in transmittance in specific, controlled regions of the visible spectra. Preferably, each filtered region should transmit at least 55% or more light. In another preferred embodiment, the shorter wavelength filtered region should transmit at least 55%, the other controlled, filtered region should transmit at least 65%, and the overall luminous transmittance of the lens should be at least 75%. In another preferred embodiment, the overall luminous transmittance of the eyewear lens with the at least two controlled, limited blocking filters is at least 80%.

Surprisingly, the inventor found that quite small decreases in transmittance in the controlled, limited blocking filter regions appreciably reduced glare and halo effects from headlamps. In a preferred embodiment, the difference between the peak blocking wavelength transmittance and the higher average baseline transmittance of the eyewear lens can be less than 30% T. In other preferred embodiments, the difference between the peak blocking wavelength transmittance and the higher average baseline transmittance of the eyewear lens can be in the range of 10-20% T.

Preferably, one feature of the invention comprises a controlled, limited blocking filter with its peak blocking wavelength in the 530-620 nm region. The eye under photopic conditions is most sensitive to light centered at about 555 nm. As luminance decreases and the eye adapts to mesopic and scotopic response, the peak sensitivity of the eye shifts toward approximately 507 nm. The inventor recognized that under night-time lighting, the eye's responsiveness shifts toward the shorter wavelengths. Therefore, to maintain higher availability of the light for night-adapted eyes, the inventor chose to preferentially filter light nearer the photopic peak rather than near the peak spectral sensitivity for mesopic/scotopic response. By this approach, when the photopic response of the eye is strongest, this filter will not severely limit visibility, due to the peak in the eye's sensitivity and the abundance of light for good response. Then, when the eye's sensitivity begins to shift toward shorter wavelengths, this filter will remove some light that is no longer as effective for the eye's responsiveness and allow the natural process of the eye to transition to its mesopic and scotopic spectral sensitivity. Preferably, this light filter transmits greater than or equal to 65% throughout the 530-620 nm region. In another preferred embodiment, the minimum transmittance for this filter occurs at a wavelength between 550 nm and 600 nm. In another preferred embodiment, the minimum transmittance of this filter occurs at a wavelength between 560 nm and 590 nm. In another preferred embodiment, the minimum transmittance of this filter occurs at a wavelength between 560 nm and 590 nm and is greater than or equal to 70%.

An additional benefit that arises when the peak blocking wavelength for this controlled filter is in the 530-620 nm spectral region is that the filter can overlap both discrete, sharply peaked emission bands and significantly broader bands of emission characteristic of the different headlamps tested. By overlapping emission bands, the filter will attenuate some of the intense light associated specifically with headlamp emissions. In another preferred embodiment, the peak blocking wavelength in the 530-620 region can be located to coincide with the emission peak for a known source.

The invention also comprises the feature of another controlled, limited blocking filter in the shorter visible wavelength region. Blue light in this shorter wavelength region scatters more easily than the longer wavelengths of light and can contribute to more noise on the optical visual signal as well as causing distracting and discomfort glare, and for some drivers, even disabling glare. FIG. 1 shows that LED lamps in particular can have an intense emission in this short wavelength region, while HID lamps may have multiple emission bands. When the eye is adapting from photopic to scotopic response, it also becomes more sensitive to the luminance level, to compensate for the much lower light exposures. Thus, a sudden excess of light (e.g., from approaching or reflected following headlamps) and especially a higher concentration of the shorter wavelengths of light, can be particularly disconcerting or dangerous.

Surprisingly, the inventor found that it was not necessary to drastically attenuate the blue light region of the spectrum to create a noticeably beneficial effect. A very moderate reduction in blue light was helpful to reduce halo effects around headlamps and glare.

In a preferred embodiment, the peak blocking wavelength of this shorter wavelength filter occurs in the range of 410-500 nm. In another preferred embodiment, the peak blocking wavelength for this filter occurs at a wavelength between 430 nm and 480 nm. This embodiment would attenuate the emission bands observed between about 430 nm and about 480 nm observed for several HID and LED headlamps. In a preferred embodiment, the minimum transmittance for a controlled, limited blocking filter with a peak blocking wavelength between 430 nm and 480 nm is >55%. In another preferred embodiment, the peak blocking wavelength for this filter occurs at a wavelength between 430 nm and 460 nm. This embodiment may have the advantage of selectively attenuating some of the more scattering blue light emissions.

In addition to the spectral location and minimum transmittance value of the peak blocking wavelength, the FWHM of the controlled filter in either of the two wavelength regions may be used to advantage for attenuation of the different headlamps. LED headlamps typically have a strong emission band and HID headlamps have multiple rather narrow emission bands in the short wavelength region of the visible spectrum. FIG. 1 also shows that different HID headlamps may have different spectral locations for emission bands, or different relative intensities of the bands. If the FWHM of the controlled filter extends over a broader portion of the visible spectrum, it will attenuate more of these emission bands in a favorable manner according to the invention. Therefore, in one preferred embodiment, one may choose a slightly wider FWHM within the controlled spectral region so that multiple emission bands may be filtered.

Another advantage of a slightly wider FWHM for the controlled limited blocking filters is lower cost and less complexity of manufacture. This is particularly advantageous when the filter is created with standard thin film coating interference designs. Narrower filters with lower transmittance values tend to require many more thin film layers to achieve proper blocking. They may also require more types of coating materials, or more expensive coating materials. Thus, the inventor's design advantageously keeps costs lower and manufacturing efficiencies higher while achieving the desired beneficial filtering of bright headlamps.

For the 410-500 nm wavelength region, the inventor found that filters with FWHM values greater than about 25 nm worked quite well to reduce scatter and improve eye comfort while driving. In a preferred embodiment, the controlled, limited blocking filter had a peak blocking wavelength in the 430-480 nm range, and more preferably in the 430-460 nm range, and a FWHM of greater than about 25 nm but less than or equal to about 45 nm. These slightly wider FWHM values allow the controlled, limited blocking filters to overlap the different emission bands associated with different lamps, and provide relief for a wider range of likely light exposures.

The inventor found such slightly wider FWHM values work well in the longer wavelength (530-620 nm) visible region, too. In a preferred embodiment, the controlled, limited blocking filter in this longer wavelength region has a peak blocking wavelength in the 550-600 nm range, and more preferably in the 560-590 nm range, and a FWHM of greater than about 30 nm but less than or equal to about 60 nm. This slightly wider FWHM range allowed the controlled, limited blocking filter to reduce some intensity over multiple emission bands for various HID headlamps, and provide some attenuation of some of the highest intensities in the broad emission bands of LED and incandescent headlamps. Due to the higher intensities of many headlamp emissions in the longer wavelength region, a broader FWHM for the controlled, limited blocking filter was not found to be detrimental to overall visual perception.

In a preferred embodiment, one or both of the controlled, limited blocking filters attenuates headlamp emission bands. This is accomplished if the filters' decreased transmittance regions overlap or align with the spectral location of the headlamps' emission bands. In one preferred embodiment, the filters will overlap at least the peak, and more preferably, the entire width of the narrow headlamp emission bands. This embodiment can be particularly advantageous for controlled filtering of the narrow emission bands of HID headlamps. In addition, in some instances, one headlamp will be attenuated by one of the invention's controlled filters, while another type or brand of headlamp will be attenuated by the other controlled filter that comprises the invention. In other instances, both controlled filters of the invention will overlap and attenuate emission peaks of the same headlamp. This is another preferred embodiment.

The controlled, limited blocking filters will be beneficial to reduce exposure to older, incandescent headlamps that exhibit very broad visible emission bands, too.

The invention may comprise additional controlled visible filters in other spectral regions, but it is preferred that the overall luminous transmittance of the eyewear lens in each instance is greater than or equal to 75%.

Figure 2:
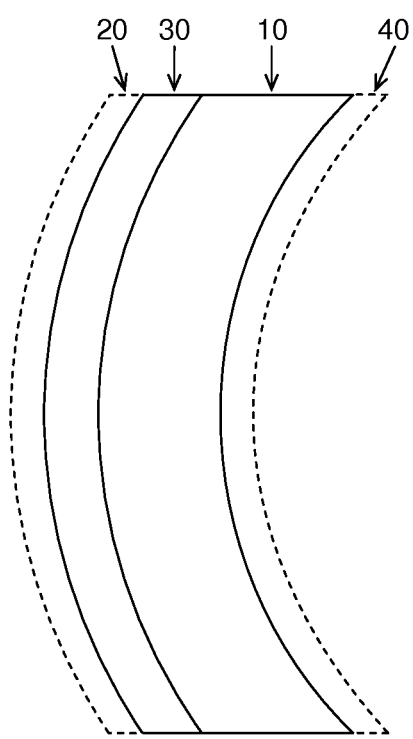
FIG. 2 shows an exemplary side view of an embodiment of the eyewear lens of the invention.

FIG. 2 shows an exemplary embodiment of the invention. The eyewear lens 10 can have various shapes and configurations as known in the art. For example, the lens may be a flat substrate, or a lens material that is curved and shaped to fit in a frame, to provide optical power, or to serve other eyewear functions. The controlled, limited blocking filters in this example are shown as 30. For this illustration, these filters are positioned on the surface with convex curvature; this would typically be the lens surface farther from the eye.

The filters of this invention can be created by known thin film coating design techniques. Deposition can be performed by techniques including vacuum, atmospheric, wet chemical, and hybrid methods. Examples of vacuum deposition techniques include chemical or physical deposition, plasma-assisted, sputtering, ion beam and laser deposition. Atmospheric methods include corona and glow discharge techniques, among others. Exemplary wet chemical techniques include spin, dip and spray methods with various curing methods (UV, thermal, plasma, IR, etc.). Hybrid techniques include such methods as sol-gel chemistry, multilayer polymeric extrusions, and depositions based on display, liquid crystal and semiconductor technologies.

It is also possible to create the filter by combinations of these different deposition techniques. For example, part of the design could be deposited by wet chemical techniques, and then vacuum depositions could be employed to complete the filter.

The filter can comprise an interference design that absorbs or reflects light. If the filter works by reflection, it should be positioned on the outer surface (the surface further from the eye) of the eyewear lens rather than on the surface facing the eye. The placement of a reflecting filter on the outer surface helps avoid excessive reflection of unwanted and uncontrolled light back into the eye. A design in which the materials absorb light may be used on either lens surface, but is commonly placed on the outer surface, as shown in FIG. 2. As an alternative embodiment (not shown), the controlled, limited blocking filters can be placed on the inner surface of the lens facing the eye. In another embodiment, the controlled, limited blocking filters could be designed and deposited or positioned on both surfaces of lens 10.

Although more complicated, it is also possible to create filters embedded or positioned within the eyewear lens. For example, a multilayer polymeric filter, or an interference thin film coating filter on a thin glass or plastic substrate, may be embedded within a lens. In another approach, a lens component can be coated by vacuum or wet deposition to form the controlled, limited blocking filters and then this component is combined with another lens component by adhesive or other bonding or joining methods to produce an eyewear lens. Alternatively, the controlled, limited blocking filters may be formed on or applied to a thin substrate (such as carrier film or microsheet glass), or another lens component, and then the substrate or lens component is further processed by casting or molding techniques to produce a full lens with the embedded filter. This provides the advantage of forming the controlled, limited blocking filters and confirming their proper performance before assembling the entire eyewear lens. In a preferred embodiment, the eyewear lens made with a thin substrate or lens component may then be formed such that the controlled filter is positioned near one of the lens surfaces. In another preferred embodiment, the controlled filter is within the thickness of the lens.

In another embodiment, the filter is created on or in a separate substrate that is then joined to the lens by adhesion, chemical bonding or physical bonding methods.

The controlled, limited blocking filter may also be formed using dyes, pigments, tints, absorbers or coloring agents that exhibit relatively narrow absorption bands in the visible spectrum. Preferably, the absorption bands of these materials have a FHWM value of less than about 100 nm, and more preferably, a FHWM value of less than 70 nm. These materials can be associated with the lens by different techniques, depending on their physical and chemical properties and manufacturing choices. For examples, these materials can added to the lens material(s), to liquid monomers or polymer mixtures that are reacted or solidified to form the lens, to coating(s) deposited onto the lens, to a thin film or substrate embedded within the lens, or combined with thin substrates that are joined to the lens. As one non-limiting example, Exciton, Inc. (Dayton, Ohio) markets various visible absorbers that could be used at low concentrations to attenuate transmission and create or assist in creating the controlled, limited blocking filters.

Similarly, low concentrations of absorbers could be used in combination with thin film design techniques to create the controlled, limited blocking filters in the two desired visible regions. Such a combination of filtering techniques could be beneficial to simplify the thin film design in terms of cost and fewer layers. In one example, the absorber or a combination of absorbers might provide attenuated transmittance in the 550 nm region, while a thin film design attenuates transmittance in the lower wavelength region. In another example, absorbers that reduce transmittance in both spectral regions could be used alone, or in combination with simple thin film designs to create the controlled, limited blocking filters of the invention.

The lens 10 may also include optional surface treatments or coatings (not shown) that improve the physical or optical properties of the lens. As one non-limiting example, lenses often are provided with hard coatings that improve the abrasion-resistance of the lens. These coatings or treatments can be placed on either or both surfaces of the lens, and could be added before or after the controlled, limited blocking filters are positioned on the lens.

Another preferred embodiment of the invention comprises anti-reflective coatings in combination with the controlled, limited blocking filters. It is particularly preferred that an anti-reflective coating be used on the inner surface of the lens (the surface toward the eye of the wearer), as illustrated by optional layer 40 in FIG. 2, to reduce exposure of the wearer to uncontrolled reflections off the inner surface caused by following headlamps. It may be useful to include anti-reflective coatings on both the inner and outer surfaces of the lens (as indicated by optional layers 20 and 40 in the example of FIG. 2), to maintain a high overall luminous transmittance while allowing the invention's filters to selectively attenuate unwanted headlamp emissions. In a preferred embodiment, the eyewear lens includes an anti-reflective coating on the inner surface that has been designed for reduced reflection of UV and/or blue light. This is particularly preferred because of the eye's shift to higher sensitivity to blue light with lower overall visible light levels.

Other coatings or layers, instead of or in addition to anti-reflective coatings, may be optionally included on lens 10 in the positions indicated by layers 20 and 40. Examples of some additional optional coatings include coatings to increase hardness, impact resistance, cleanability, hydrophobicity, or enhance optical properties.

While this discussion has focused on controlled, limited filtering of headlamps, one skilled in the art will recognize that this approach may also be useful to attenuate bright illumination from lighted signs, searchlights, beacons, or other discrete bright light sources encountered while driving at night. Similarly, one may be exposed to extremely bright lights from night-time roadway construction projects. Incandescent, fluorescent, LED or other lights may be used on such projects, and can pose a significant source of distracting or debilitating light while driving. The present invention can be beneficial with respect to these lights, too. The invention's controlled, limited blocking filter in the 410-500 nm region will be particularly beneficial to reduce blue-light scatter and over-exposure of a night-adapted eye to these bright sources. The invention's controlled, limited blocking filter in the 530-

620 nm region will similarly reduce over-exposure in a wavelength region that often covers these sources' maximum output.

The inventor surprisingly found that, while the invention was specifically developed to aid with night driving, the lens was particularly comfortable to use during normal daytime activities and especially in office use. The inventor's requirement that the overall luminous transmittance of the eyewear lens is at least 75% provides more than sufficient transmittance for normal daytime activities. In addition, the controlled, limited blocking filters, particularly in the shorter wavelength region, can attenuate blue light or high energy visible light emitted from common computer and handheld displays, and from fluorescent, LED and other artificial light sources in standard use in home, school or business settings. Thus, the lens can be used for general daily eyewear as well as for night driving.

These variations and configurations are not comprehensive of all possible embodiments, but provide further examples that one skilled in the art would recognize are within the scope of the invention.

The invention will now be described in more specific detail with reference to the following non-limiting examples.

Thin film interference multilayer filters were designed in accordance with the invention, or as comparisons to it, and formed by vacuum deposition on exemplary lens material substrates. The configuration of these samples is shown in FIG. 2, with the controlled, limited blocking filters 30 deposited on the outer surface of the lens. Optional layers were not included. Conventional thin film coating materials chosen from silicon dioxide, SiOx, titanium dioxide, tantalum pentoxide, zirconium dioxide, yttrium dioxide, scandium dioxide and aluminum oxide were used to form the interference layers. For convenience, standard flat glass substrates were used as well as nominally 6B eyewear lens substrates, made from Trivex (PPG Industries Ohio, Inc.) polyurea-urethane lens material containing UV absorbers, and surfaced to 2 mm thick planos.

Figure 3:
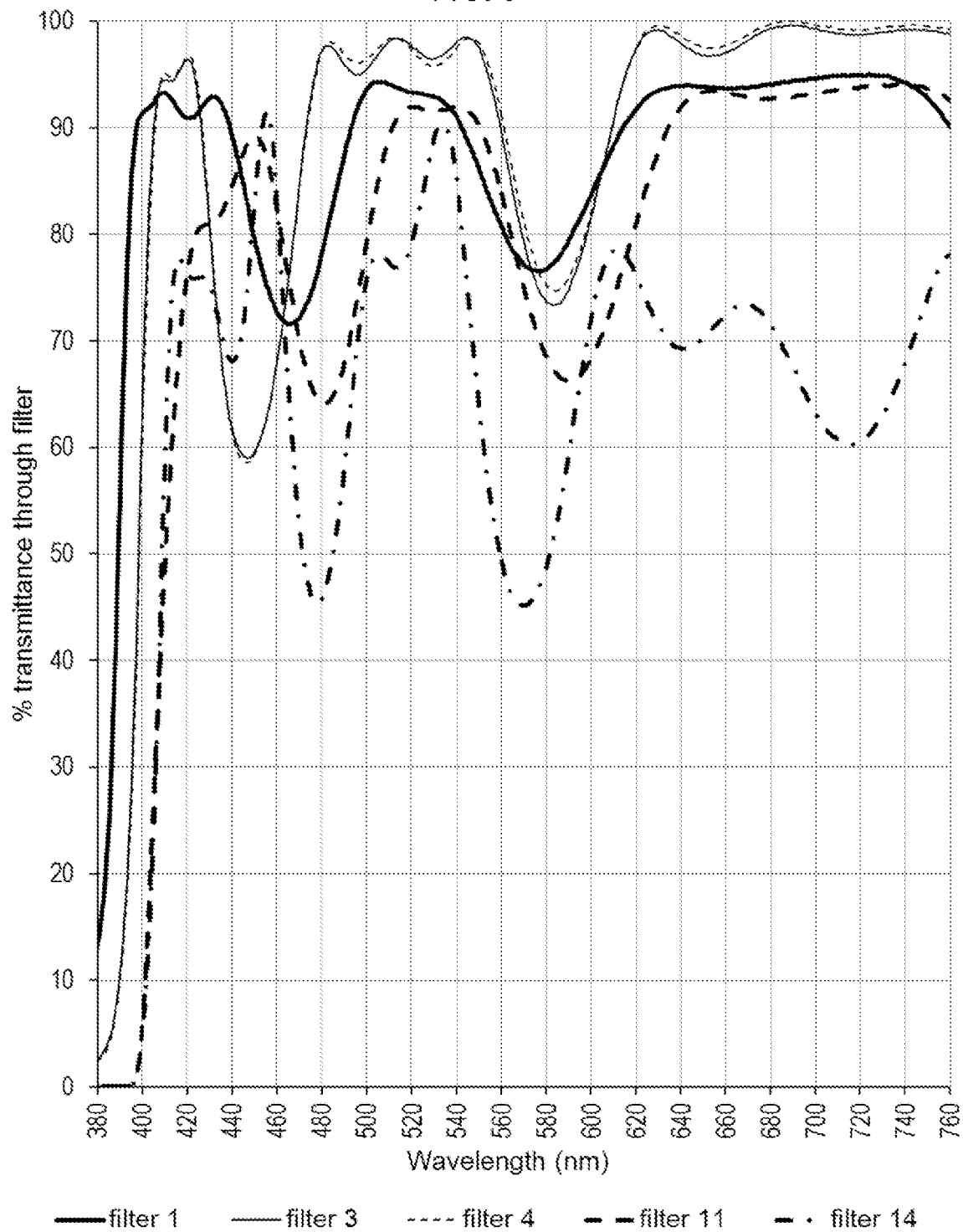
FIG. 3 shows exemplary transmittance spectra for eyeglass lens filters according to the invention and another filter tested for comparison.

Several different filter designs were evaluated, and FIG. 3 shows the transmittance measured on five different resultant lenses using a Shimadzu UV-visible spectrophotometer. Additional details on these five samples of lens materials and their filters are given in Table 1 below. Filters 3 and 4 were produced using the same thin film filter design, and are included to examine reproducibility.

TABLE 1

Lens materials with filters

| Filter # | substrate material | number of thin film layers | Luminous T (D65, 2 degree) |
|---|---|---|---|
| 1 | glass | 35 | 86% |
| 3 | glass | 25 | 90% |
| 4 | glass | 25 | 90% |
| 11 | Trivex | 20 | 81.5% |
| 14 (for comparison) | Trivex | 17 | 67% |

As shown in FIG. 3, the spectra for these samples each exhibit at least one controlled, limited blocking filter with its peak blocking wavelength in the 410-500 nm region, and at least another controlled, limited blocking filter with its peak blocking wavelength in the 530-620 nm region. The peak blocking wavelengths and the minimum transmittance at the peak blocking wavelengths differ among these samples. Note that filter 14 has approximately 45% minimum transmittance values for its controlled filter in the 410-500 region and its controlled filter in the 530-620 region. In addition, its luminous transmittance value is less than the desired value of at least 75%. Evaluation of filter 14 allows comparison with a design outside the range of the invention.

Example 1

The inventor tested the five samples of Table 1 in real-world conditions by holding or mounting them in front of his eyes and viewing headlamps at dusk and after dark under the following conditions:
A: viewing headlamps by standing in front of various cars parked in a driveway, and
B: while seated in a car in either the driver (stationary) or passenger (stationary and in motion) position, and looking through the windscreen at oncoming headlamps.

The inventor found that under condition A, filters 1, 3, 4 and 11 all performed about the same, with some noticeable reduction in the headlamp intensities. Filter 14 gave a noticeable yellow-green tint to the white light of the headlamps, and seemed to diminish the headlamp intensities too much. Filter 14 was judged by the inventor to exhibit inferior filtering performance vs. the other samples compared under condition A.

Under the more commonly experienced condition B, the inventor noted that filters 3 and 4 clearly gave the best performance by immediately removing the halo effect around headlamps. The inventor observed that one could look into the light source without discomfort with filters 3 and 4. The next best sample to cut glare, reduce halo around the headlamps and decrease viewing discomfort was filter 1. However, filter 1 did not decrease halo and glare as well as filters 3 and 4, so the inventor's perception of the headlamps was not as crisp and clean. No significant difference was noted between filters 3 and 4 while viewing headlamps. This confirms that spectral observation that these two samples were very similar (see FIG. 3).

With filter 11, the halo was diminished, but points of bright magenta light appeared beyond the halo's edge. This was a distracting effect. It was also noted by the inventor under condition A, but was not perceived as troublesome as under condition B.

Viewing headlamps under condition B with filter 14 was very unsatisfactory for the inventor. As noted under condition A, this filter imparted a yellow-green tint to the white headlamp glow. Significant halo effects were perceived using filter 14, and this was judged to be less effective than any of the other samples.

Under condition B, the inventor viewed various HID, LED and incandescent headlamps. In each case, the inventor noted that filters 3 and 4 did a good job of lessening halos around headlamps, particularly blue-tinted haloes, and the view was crisp and comfortable. The inventor did not have a feeling that too little light was reaching the eye when viewing headlamps through any of filters 1, 3, 4, or 11.

Comparative Example 2

For comparison, the inventor evaluated a standard, clear eyewear lens with front and back anti-reflective coatings, but without the controlled, limited blocking filters of the invention, to observe headlamps under the same condition B as used for EXAMPLE 1. Anti-reflective coatings are often recommended for night driving because they reduce reflections of light directly off the surfaces of the lens and increase overall transmittance of the lens. While these are beneficial features, the inventor found, in sequential use of anti-reflective coated lenses and the comparative filter 3 of EXAMPLE 1, that filter 3 gave much clearer viewing of oncoming headlamps and better reduced scatter and headlamp halo.

None of the lenses with filters described in Table 1 has anti-reflective coatings. From the evaluation of filters in EXAMPLES 1 and 2, and other practical experience, the inventor suggested that one preferred embodiment of the invention would be to add an anti-reflective coating to at least the inner surface of the lens with filter 3 or 4, to further reduce the amount of unfiltered light that reaches the eye.

The transmittance of various headlamps as filtered by the samples in Table 1 is shown in FIGS. 4-8. The transmittance was measured using an Ocean Optics (Dunedin, Fla.) USB2000 spectrophotometer equipped with a grating sensitive over the spectral range of about 340-1080 nm, corrected for dark current signal. The spectrophotometer is coupled to Ocean Optics software capable of recording data at approximately 0.3 nm intervals. A fiber optic connected to the spectrophotometer was aimed at various headlamps, and emission recorded in arbitrary units of intensity. Then the selected filter was interposed directly between the fiber optics and the headlamp, to record how the filter affected the headlamp light intensity. An LED headlamp and two HID headlamps were tested with the filters of Table 1 for these experiments; for reference, these headlamps un-filtered emission spectra are also included in FIG. 1. Emission from the headlamps (direct or as attenuated by the filters) is measured by the 2048-element CCD array of the spectrophotometer in arbitrary units of intensity.

Example 3

Figure 4:
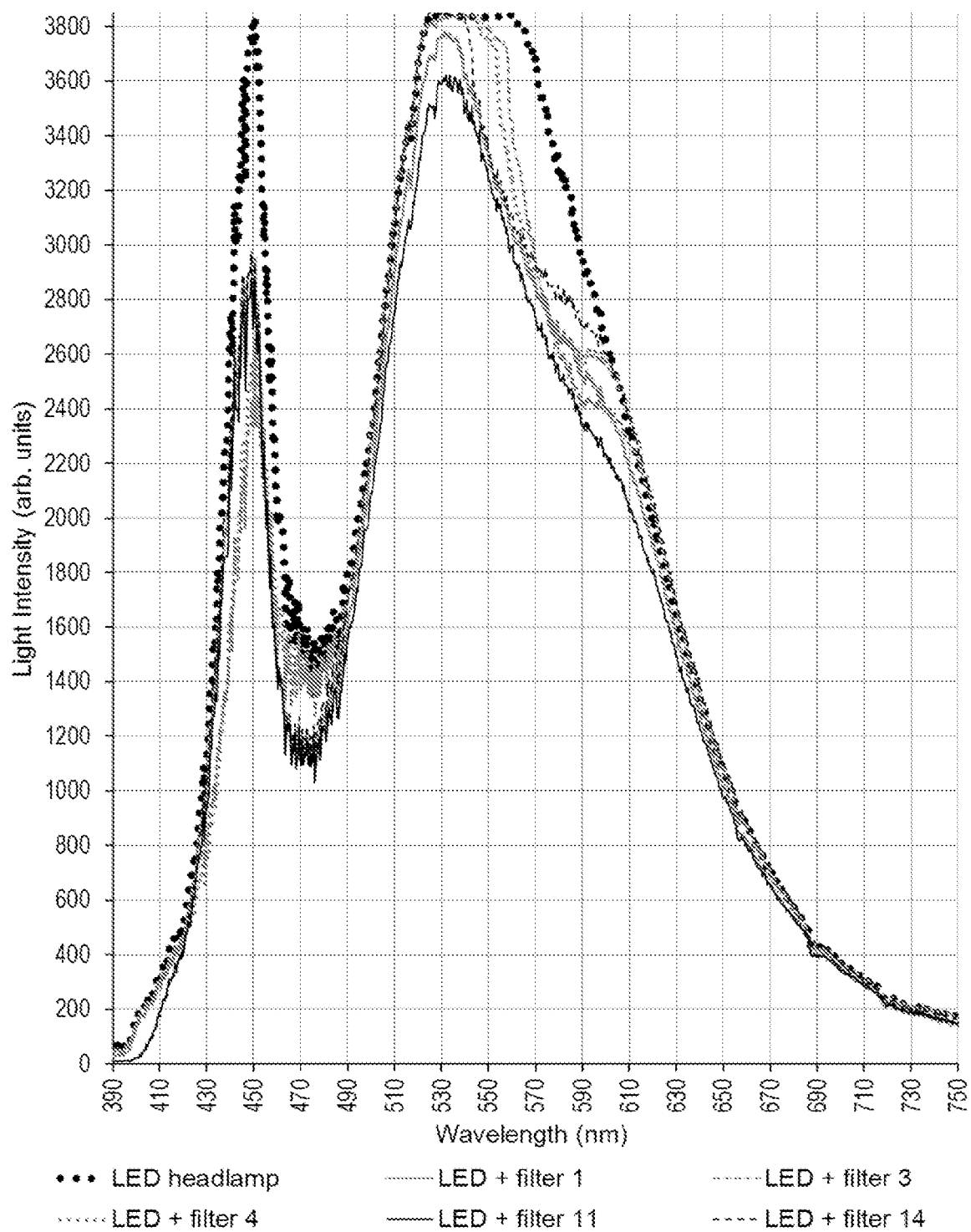
FIG. 4 shows how the emission of the exemplary LED headlamp of FIG. 1 is attenuated by the filters of FIG. 3 over the visible spectrum from 390 nm to 750 nm.

FIG. 4 shows the unfiltered LED headlamp emission (heavy dotted line), and the headlamp spectra as transmitted through each of the sample filters in listed Table 1. It is clear that filters 3 and 4 (light grey dotted and dashed traces) attenuate more of the LED emission near 450 nm than the other samples. This can be helpful to reduce blue-light scatter and glare, as the inventor noted in EXAMPLE 1. Note that filters 1, 11 and 14 attenuate less of the peak emission near 450 nm, but attenuate the region of 460-490 nm, where a dip occurs in the lamp emission, to a greater extent than do filters 3 and 4. For LED headlamps, as noted by the inventor's observations in EXAMPLE 1, filters 3 and 4 were more preferred to reduce glare and haloes than the other filters. This could indicate that more filtering in the emission region of 460-490 nm may not contribute to reducing glare and halo effects as effectively as the controlled, limited blocking in the lower wavelength region. All of the tested filters reduce the broader and intense emission above 490 nm. However, as noted in EXAMPLE 1, none of the filters were observed to reduce the intensity to such an extent that the inventor felt too little light was available for night driving.

Example 4

Figure 5:
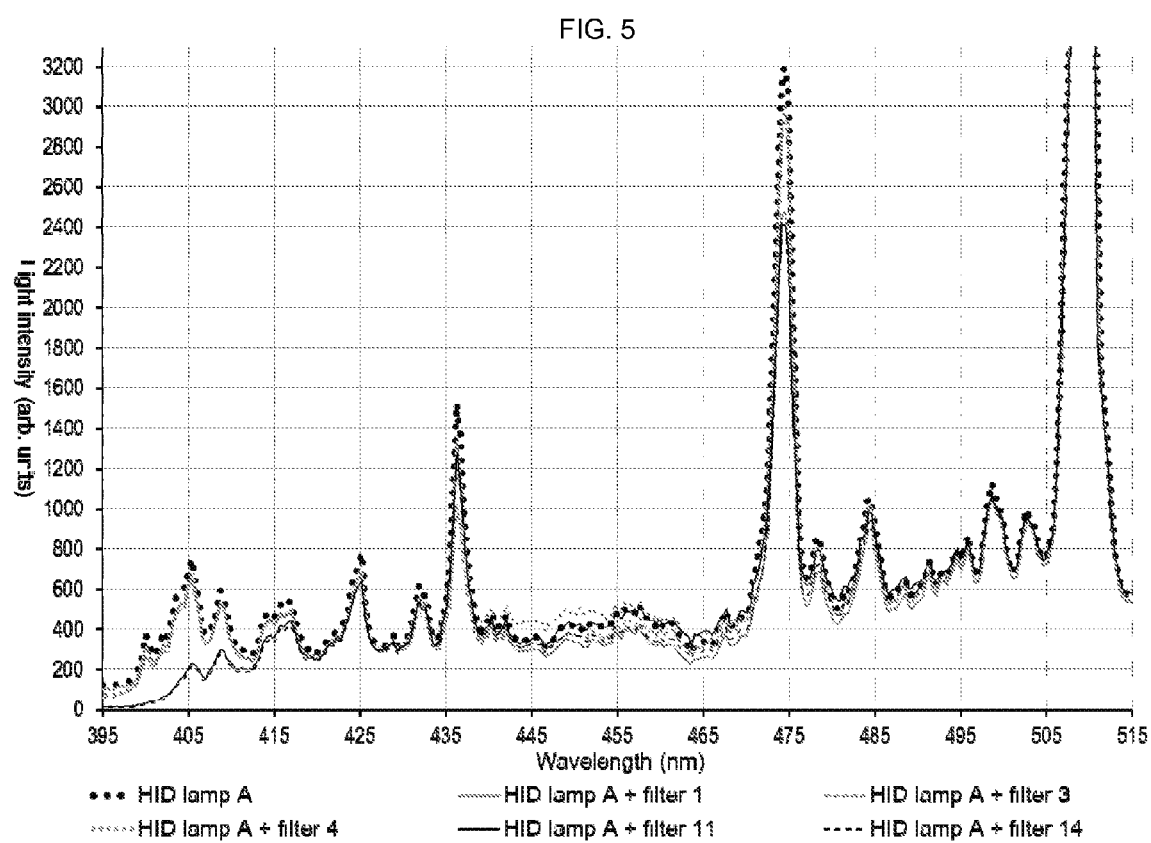
FIG. 5 shows how the emission of the exemplary headlamp HID A in FIG. 1 is attenuated by the filters of FIG. 3 in the shorter wavelength region of the visible spectrum (395-515 nm).
Figure 6:
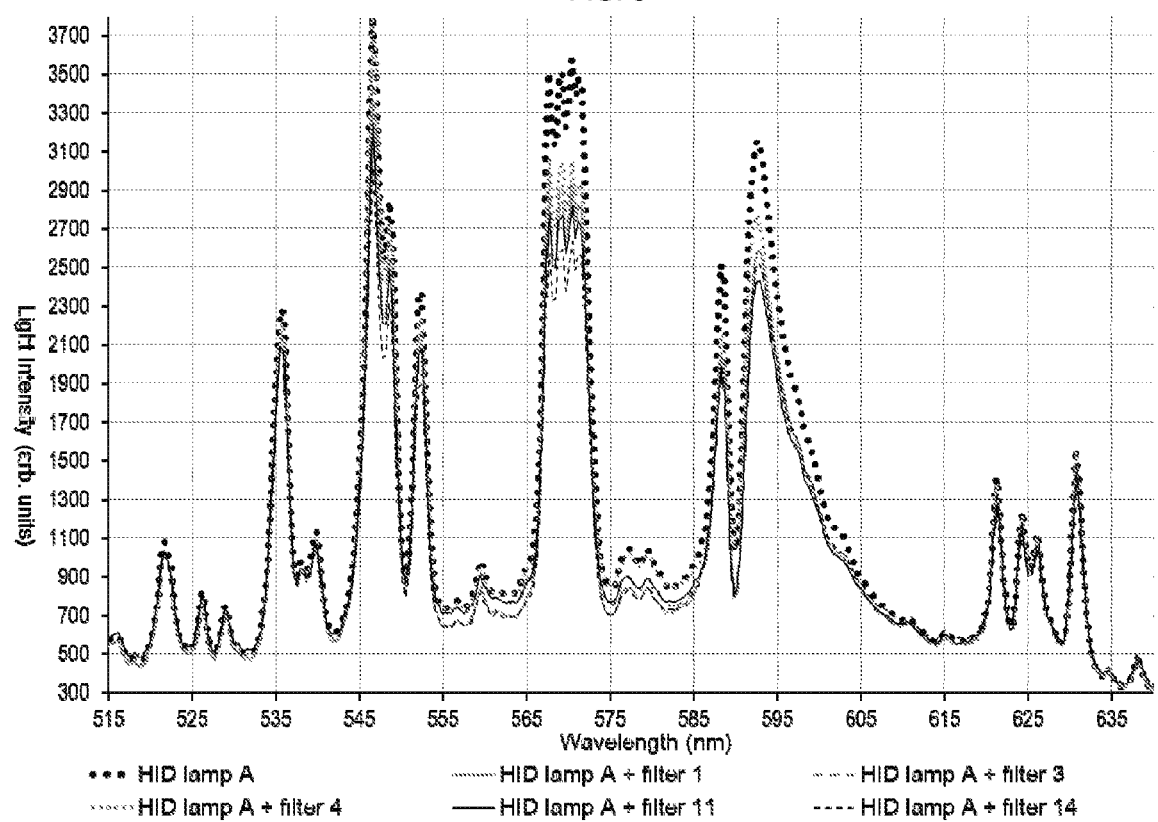
FIG. 6 shows how the emission of the exemplary headlamp HID A in FIG. 1 is attenuated by the filters of FIG. 3 in the longer wavelength region of the visible spectrum (515-640 nm).

FIGS. 5-6 shows the unfiltered emission of a HID headlamp A (heavy dotted line), and this headlamp's spectra as transmitted through each of the sample filters in listed Table 1. For easier analysis of the spectra and filtering effects, FIG. 5 shows spectral plots over the shorter visible wavelength region from 395 nm to 515 nm, and FIG. 6 shows spectral plots over the longer visible wavelength region from 515 nm to 640 nm.

In FIG. 5, one can see that filters 3 and 4 reduce more of this HID headlamp's emission band near 436 nm than the other filters evaluated. This correlates with a greater reduction of blue light which is more prevalently scattered than light emitted at longer wavelengths. This may play an important role in the perception noted in EXAMPLE 1 that viewing through filters 3 and 4 gave crisp, clear views of headlamps, with less halo effects. FIG. 5 shows that the headlamp's emission peak near 475 nm is much less attenuated by filters 3 and 4, but is more attenuated by the other filters. Less attenuation at this longer wavelength may not be detrimental for viewing this particular HID headlamp, because this light may not be scattered as much as the shorter wavelength emissions. In addition, the emission near 475 nm is nearer to the scotopic peak sensitivity of 507 nm and may help with overall eye responsiveness.

FIG. 6 shows similar more limited attenuation of the peak near 535 nm by filters 3 and 4 and more attenuation by filters 1, 11 and 14, respectively. Again, this more limited attenuation may be advantageous for these emissions nearer the peak scotopic sensitivity region. As one move toward longer wavelengths, all of the filters attenuate the emission bands a demonstrable amount. If at least some of these longer wavelength emissions account for excess intensity as the eye adapts to lower overall light levels, such attenuation at the longer wavelengths may still supply sufficient illumination, and more helpfully, shift the light distribution toward more intensity at shorter wavelengths for better night vision.

In EXAMPLE 1, it was noted that filter 14 may have diminished the headlamp intensity too much. FIGS. 5 and 6 show that for this HID headlamp's emissions between about 475 nm and 585 nm, filter 14 attenuates more light than any of the other sampled filters. This is consistent with its lower minimum transmittance as shown in Table 1 and FIG. 2. This observation supports the inventor's finding that a controlled, limited blocking filter is more effective than larger reductions in transmittance. The blocking of filter 14 has exceeded the preferred values.

Example 5

Figure 7:
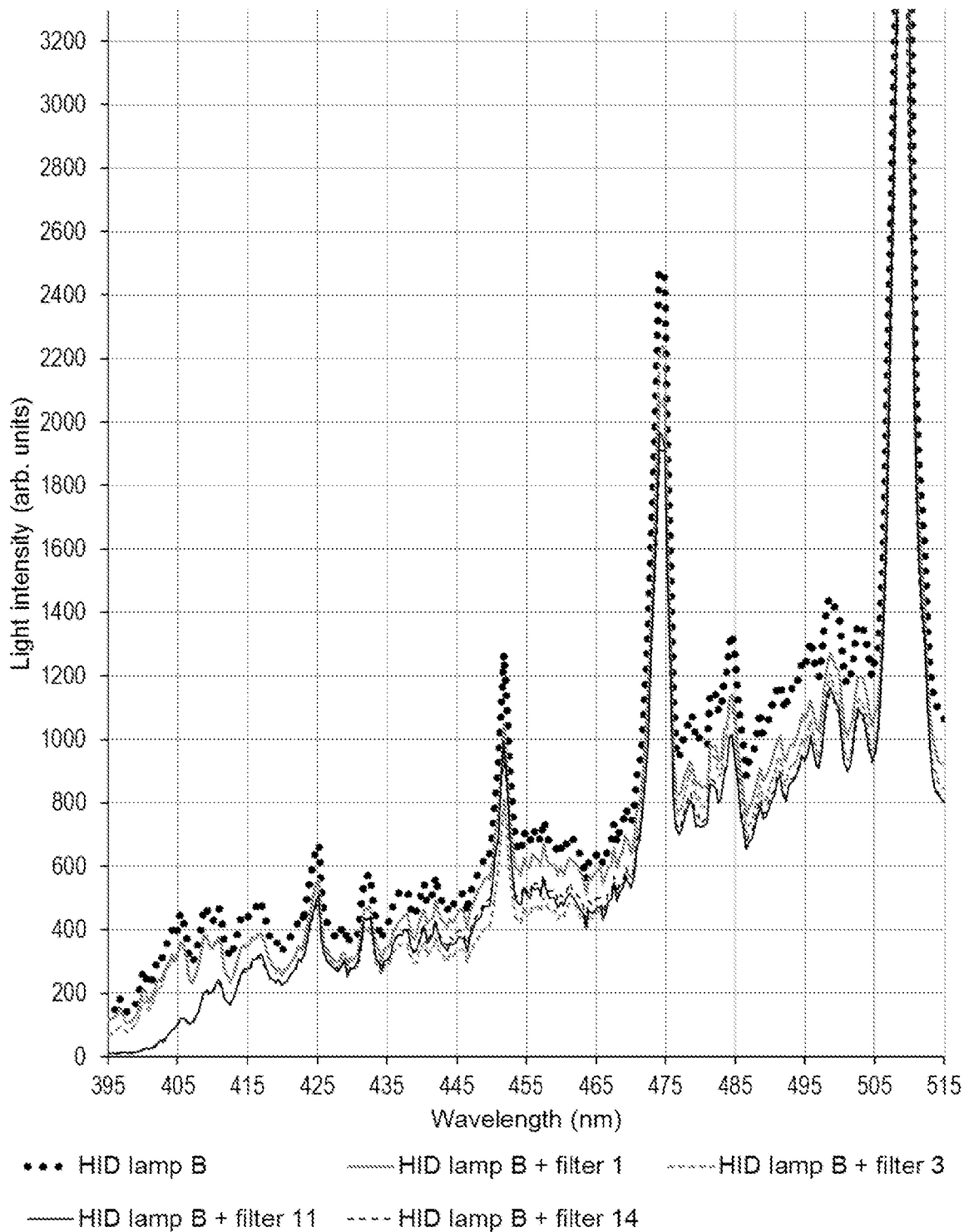
FIG. 7 shows how the emission of the exemplary headlamp HID B in FIG. 1 is attenuated by the filters of FIG. 3 in the shorter wavelength region of the visible spectrum (395-515 nm).
Figure 8:
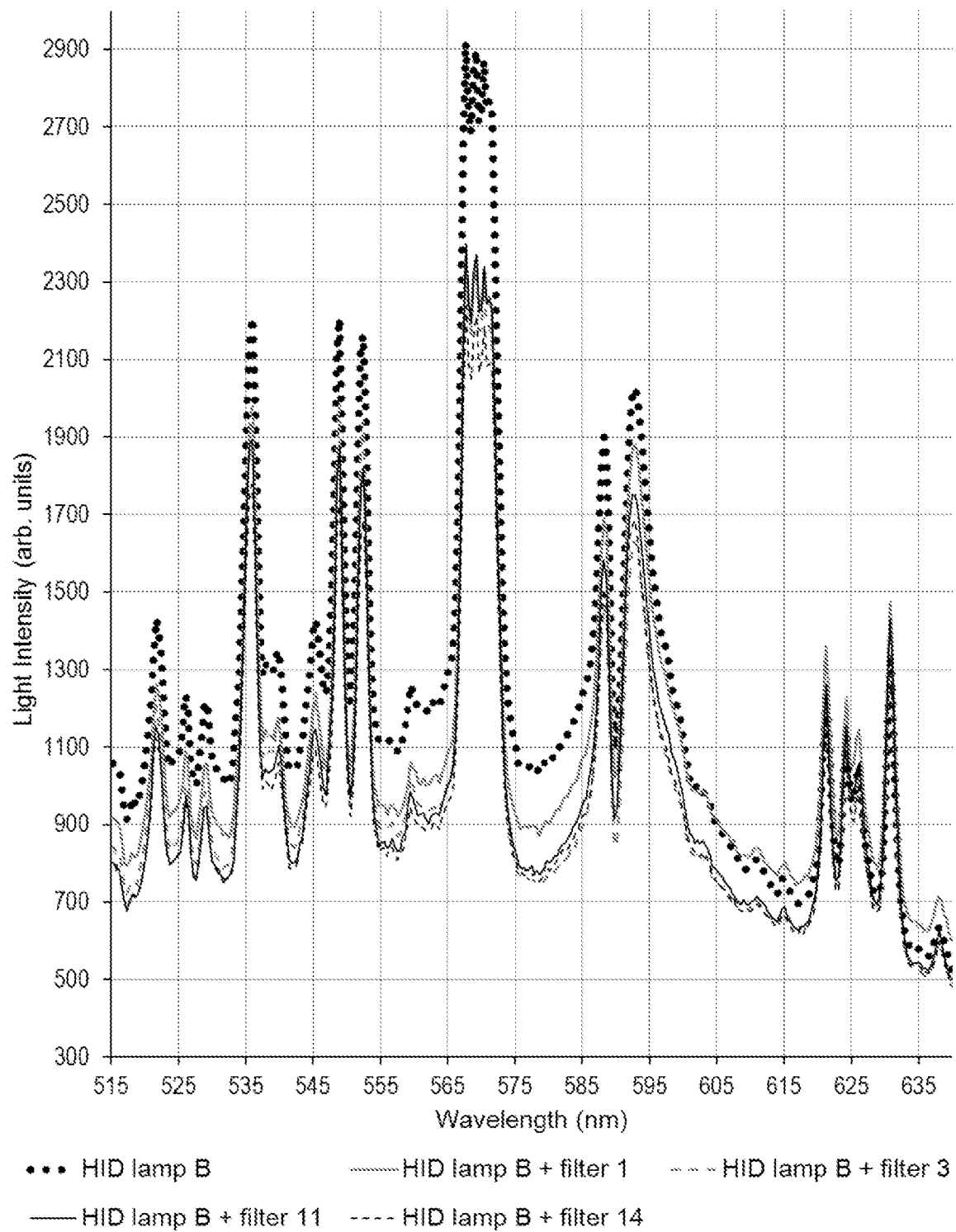
FIG. 8 shows how the emission of the exemplary headlamp HID B in FIG. 1 is attenuated by the filters of FIG. 3 in the longer wavelength region of the visible spectrum (515-640 nm).

FIGS. 7-8 shows the unfiltered emission of another HID headlamp, labeled B (heavy dotted line), and this headlamp's spectra as transmitted through sample filters 1, 3, 11 and 14 in listed Table 1. Like FIGS. 5 and 6, FIGS. 7 and 8 shows the shorter visible wavelength region and the longer visible wavelength region, respectively. FIGS. 5 and 7 use the same shorter wavelength x-axis, and FIGS. 6 and 8 use the same longer wavelength x-axis, so that one can more easily compare the different headlamp emissions and the effects of the filters.

In FIG. 7, one can see that filter 3 reduces more of this HID headlamp's emission band near about 450 nm than the other filters evaluated. As in EXAMPLE 4, this may allow greater reduction of blue light and reduce more scatter for a crisp, clear view of the headlamp. FIG. 7 shows that this HID headlamp also has a strong emission band near 475 nm, which again is much less attenuated by filter 3 than by the other filters. As in EXAMPLE 4, this was not judged to critically degrade the performance of filter 3 in reducing glare and halo effects.

FIG. 8 shows more limited attenuation of the peak near 535 nm and the two peaks near 550 nm by filter 3 than by the other sampled filters. Again, this more limited attenuation may be advantageous for viewing this headlamp's emissions nearer the peak scotopic sensitivity region. As one moves to longer wavelengths, all of the filters attenuate the emission bands a demonstrable amount. For some of this headlamp's longer wavelength emissions, both filter 3 and filter 14 attenuate more strongly than filters 1 and 11. However, the higher overall transmittance of filter 3 vs. filter 14 (90% vs. 67%, respectively) likely plays a role in filter 3's preferred performance in the practical tests of EXAMPLE 1 and 2.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

What is claimed is:

1. An eyewear lens for reducing transmittance in at least two regions of the visible light spectrum, comprising:
    a first controlled, limited blocking filter having a peak blocking wavelength between 410 nm and 500 nm, and a minimum transmittance at the peak blocking wavelength of ≥55%; and
    a second controlled, limited blocking filter having a peak blocking wavelength between 530 nm and 620 nm, and a minimum transmittance at the peak blocking wavelength of ≥65%,
    wherein the overall luminous transmittance of the eyewear lens is ≥80%.

2. The eyewear lens of claim 1, wherein the first controlled, limited blocking filter has a peak blocking wavelength between 430 nm and 480 nm.

3. The eyewear lens of claim 2, wherein the first controlled, limited blocking filter has a minimum transmittance at its peak blocking wavelength of 55-75%.

4. The eyewear lens of claim 1, wherein the first controlled, limited blocking filter has a peak blocking wavelength between 430 nm and 460 nm.

5. The eyewear lens of claim 4, wherein the first controlled, limited blocking filter has a FWHM>25 nm.

6. The eyewear lens of claim 5, wherein the first controlled, limited blocking filter has a FWHM≤45 nm.

7. The eyewear lens of claim 1, wherein the second controlled, limited blocking filter has a peak blocking wavelength between 550 nm and 600 nm.

8. The eyewear lens of claim 1, wherein the second controlled, limited blocking filter has a peak blocking wavelength between 560 nm and 590 nm.

9. The eyewear lens of claim 8, wherein the second controlled, limited blocking filter has a minimum transmittance of ≥70%.

10. The eyewear lens of claim 8, wherein the second controlled, limited blocking filter has a FWHM greater than about 30 nm and less than about 60 nm.

11. The eyewear lens of claim 1, further comprising an anti-reflective coating on at least an inner surface of the eyewear lens.

12. The eyewear lens of claim 11, wherein the anti-reflective coating on the inner surface of the eyewear lens reduces reflection of UV light.

13. The eyewear lens of claim 1, wherein the first and second controlled, limited blocking filters attenuate emission bands of light emitted from headlamps.

14. The eyewear lens of claim 13, wherein the first and second controlled, limited blocking filters attenuate at least two emission bands of light emitted from high intensity discharge headlamps.

15. The eyewear lens of claim 13, wherein the first and second controlled, limited blocking filters attenuate at least two emission bands of light emitted from light-emitting diode headlamps.

16. The eyewear lens of claim 1, wherein the first and second controlled, limited blocking filters attenuate emission bands of light emitted from fluorescent light sources.

17. The eyewear lens of claim 1, wherein the first controlled, limited blocking filter comprises a material selected from the group consisting of dyes, pigments, tints, absorbers and coloring agents.

18. The eyewear lens of claim 1, wherein the second controlled, limited blocking filter comprises a material selected from the group consisting of dyes, pigments, tints, absorbers and coloring agents.

* * * * *

UNITED STATES PATENT AND TRADEMARK OFFICE
CERTIFICATE OF CORRECTION

PATENT NO. : 8,911,082 B2
APPLICATION NO. : 13/829680
DATED : December 16, 2014
INVENTOR(S) : David Mark Ambler It is certified that error appears in the above-identified patent and that said Letters Patent is hereby corrected as shown below:

ON THE TITLE PAGE

Item 73, please correct the name of the Assignee as follows:

Add Assignee: -- Younger MFG. Co. DBA Younger Optics, Torrance, CA --

Remove: -- Indizen Optical Technologies, S.L., Madrid, Spain --

Signed and Sealed this
Third Day of November, 2015

Michelle K. Lee
*Director of the United States Patent and Trademark Office*